Figure 1:
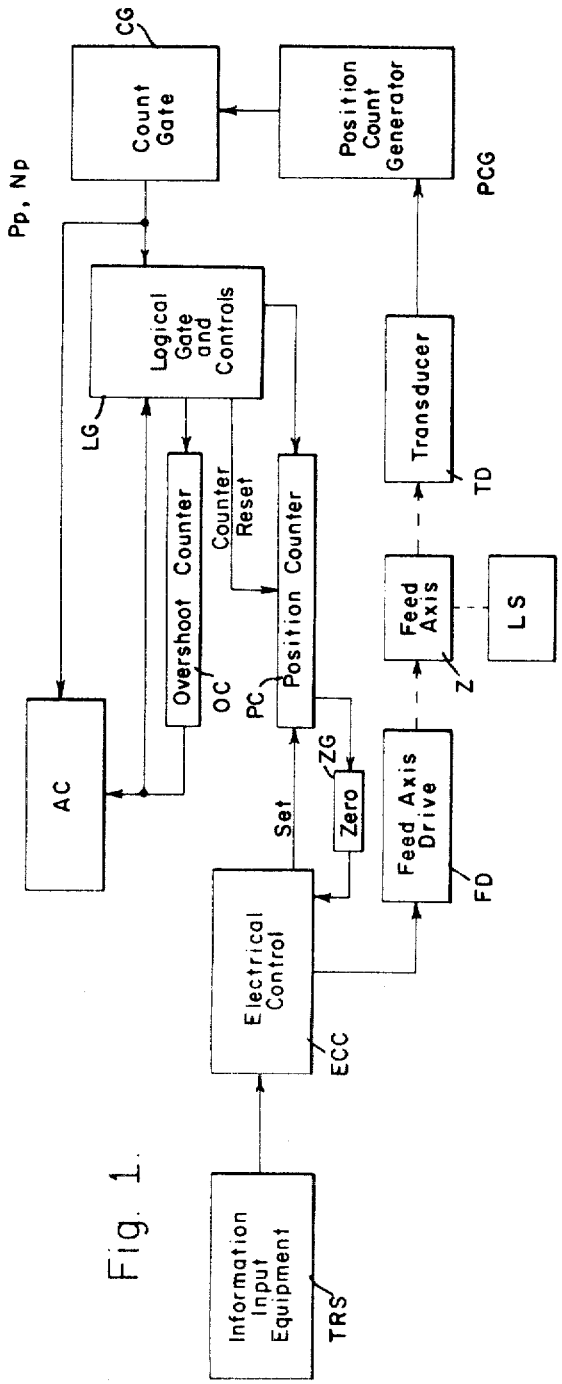

Nov. 14, 1967   E. J. TOSCANO   3,353,161
ELECTRICAL CONTROL SYSTEM FOR MACHINE TOOL DEVICE
WITH OVERSHOOT CORRECTION FEATURE
Filed June 23, 1965   2 Sheets-Sheet 1

Esteban J. Toscano,
INVENTOR.

BY
E. F. Oberhein

AGENT.

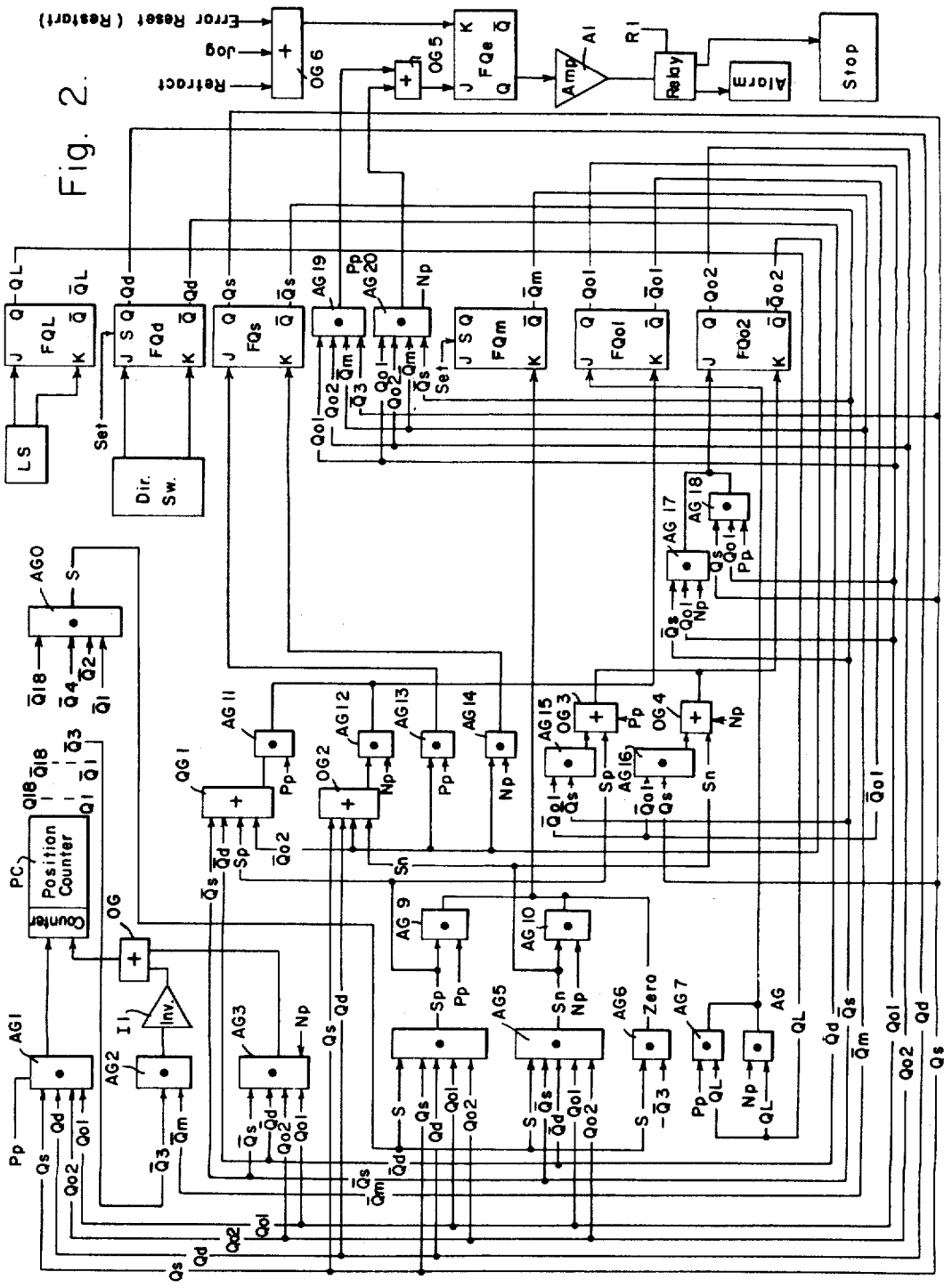

United States Patent Office 3,353,161
Patented Nov. 14, 1967

3,353,161
ELECTRICAL CONTROL SYSTEM FOR MACHINE TOOL DEVICE WITH OVERSHOOT CORRECTION FEATURE
Esteban J. Toscano, Los Angeles, Calif., assignor to Hughes Aircraft Company, Culver City, Calif., a corporation of Delaware
Filed June 23, 1965, Ser. No. 466,315
8 Claims. (Cl. 340—172.5)

This invention relates generally to positioning systems, and more particularly to incremental positioning systems.

Although the invention is described herein in connection with the positioning of an element of a machine tool in a particular axis of movement, it will be appreciated that the invention is useful in any situation in which one element is to be positioned in relation to another, as in automatic assembling operations, for example.

Incremental positioning arrangements for the elements of a machine tool are usually programmed by means of a tape reader which contains information for positioning a part or a tool in such a way that the machine operation may be done at a particularly selected point on the part which is to be machined. The information which is read from the tape is frequently stored in suitable electronic storage facilities in the electronic controls for the machine tool and used to control the servos to achieve precise positioning.

The electronic controls for such an arrangement may typically include a counter which receives information from the tape which sets the counter so that it contains a count of a precise position in a particularly selected machine tool axis. Thereafter the machine tool operates to position the table or the cutting tool or both in such a way that the programmed position is duplicated in the actual positioning of the table or the tool or both in the selected axis of the machine tool.

Efforts to minimize the costs in the electronic system through simplification of electronic controls have lead to the development of a machine tool system which utilizes a count down type of counter, that is, a one-way counter which receives information from the tape indicative of a position in a particular axis of the tool. The relatively movable parts in the axis of the tool mount respective parts of an incremental position transducer which produce signals representative of increments of positioning movement and form part of a position count generator which drives the counter.

By this expedient the position which is to be achieved in the selected axis is programmed on the tape and stored in the counter. Thereafter as relative movement takes place in the selected axis the increments of movement represented by signals generated by the transducer which are coupled to the counter cause the counter to be counted down. At some particularly predetermined minimum count of the counter which may include zero the machine axis is at the programmed position.

In an effort to achieve precise positioning and with an arrangement of this type to avoid the accumulation of scale count errors through failure of the machine slide to stop at the precise position, an arrangement has been provided as seen in a copending application, Serial No. 421,743, of Melvin R. McElroy, entitled Counting Circuit, and assigned to the assignee of this invention, the original of which was filed February 17, 1961, in which provision is made for accumulating counts of minor overshoots of a desired position in a particular axis. For example, such an overshoot facility may permit the accumulation of three to six scale counts, scale count as used here representing a minimum countable increment of position. In the arrangement described in said copending application once the counter has been counted to zero, or to some predetermined minimum count, the overflow counts due to movement beyond the programmed position are accumulated in the small overshoot counter. The arrangement is such that with the next positioning movement the overshoot counts will always be considered in connection with such positioning whence if a positioning operation is to continue in the same direction as before the count of overshoot increments is subtracted from the new position, or if the direction of positioning is reversed at this point the count of overshoot increments of position is added to the new programmed position. It is desirable to minimize the size of the overshoot register since the size of the overshoot register, say three counts to six counts, controls the minimum programmable distance. When the overshoot register is this small occasional overflow of the overshoot register may take place. When this happens counts are lost and an error has occurred.

In a system of the type hereinabove described this invention in one of its aspects is directed to an arrangement which utilizes the basic elements employed in achieving a control of the system so that an error resulting from overflow is immediately recognized. An arrangement of this type according to this invention may be designated an overshoot detector and may include gates or other logical elements which enables the detection of a condition of overflow of the overshoot register. An arrangement of this type may additionally include facilities for manual operation which disable the normal error detector function, inasmuch as no control of pulses takes place in the manual mode of operation.

In another of its aspects this invention contemplates a logical gating facility which recognizes movement in a machine axis past a desired position which does not exceed the capacity of the overshoot counter and which therefore does not result in an overflow. This character of control provides an indication of overshoot of the desired position to permit corrective adjustment if desired but does not indicate a condition requiring shut down since there is no overflow error.

One object of this invention is to provide an incremental positioning system which is simple with respect to operational requirements and positive in operation.

Another object of this invention is to provide an incremental positioning system of the character referred to in which the possibility of unrecognized overshoot of a particular desired position is minimized.

Figure 3:
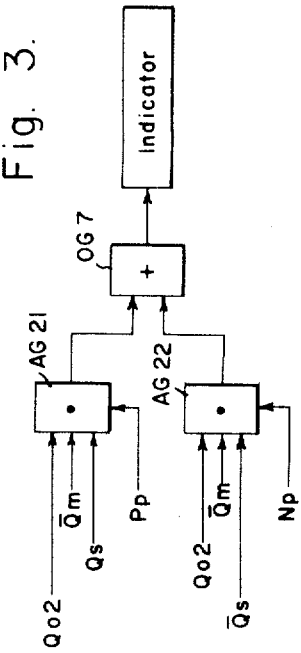

The aforesaid and other objects and advantages will be better understood by reference to the following specification when considered in conjunction with the accompanying drawings in which:

FIG. 1 is a block diagram broadly illustrating the invention;

FIG. 2 diagrammatically illustrates the details of one embodiment of this invention; and FIG. 3 diagrammatically illustrates the details of a second embodiment of this invention.

The block diagram of FIG. 1 broadly illustrates a positioning system of the type embodying this invention.

The general features of this system are illustrated in greater detail in a copending application of E. J. Toscano et al., Serial No. 332,398, filed Dec. 23, 1963, entitled Electrical Control System, and assigned to the assignee of this invention. The discussions hereinafter will include such features and such details of the system illustrated in said copending application as are believed necessary to a system of this invention. Additional details may be had by reference to said copending application.

The system of FIG. 1 illustrates a general organization for positioning an element of a machine tool in a feed axis, generally designated Z, by means of power provided by a feed axis drive which in turn is under the control of an electrical control system, generally designated ECC. The input to the system is represented as a block entitled Information Input Equipment which may be a conventional type of tape reader system TRS producing discrete output signals which are coupled inputwise to the electrical control system through a suitable distributor type of network as described in said copending application to be eventually entered into a position counter such as the counter PC, the output of which is coupled back to the electrical control system ECC through a gate system, generally designated ZG, to control the feed axis drive. The feed axis drive is coupled to a transducer means, generally designated TD, the electrical output of which is coupled inputwise to a position count generator PCG which suitably shapes the outputs of the transducers. The outputs of the position count generator are coupled inputwise to a count gate CG which is described in said copending application and which produces electrical output pulses $Pp$ or $Np$ for positive or negative directions of movement of the feed axis. The transducer means, the position count generator and the count gate constitute a count pulse generator producing one count pulse for each countable scale increment. A logical gating network LG receives the output pulses $Pp$ or $Np$ of the count gate CG and couples the pulses $Pp$ or $Np$ to an overshoot counter OC and the position counter PC. The output of the overshoot counter as shown is coupled to the logical gating network LG and is used to control the introduction of control pulses $Pp$ or $Np$ to the position counter PC. The output of the overshoot counter, in accordance with this invention is further coupled inputwise to an alarm circuit AC, along with the pulses $Pp$ or $Np$ from the count gate circuit CG to produce an indication that the capacity of the overshoot counter in positioning movement has been exceeded as evidenced by a particular configuration of the flip-flop of the overshoot counter, as will be described.

As described in said copending application, the position counter is essentially a count down type of decade counter. Each decade conventionally comprises four flip-flops. The flip-flops are set by signals generated by the tape reader system as the tape is being read. This information is coupled sequentially from the tape into the different decades of the counter through a suitable distributor network, not illustrated herein but which may be assumed to form a part of the electrical control. The count indicated by the counter at the end of the input operation represents the actual position which is desired in the particular feed axis.

The overshoot counter is normally set so that all of its flip-flops are off. In the embodiments of the invention to be described herein the overshoot counter comprises two flip-flops and on this basis provides a storage facility for three overshoot counts. The logical gating network LG which receives the count pulses from the count gate is enabled so that the first three count pulses are coupled to the overshoot counter which now runs through its cycle so that both overshoot flip-flops are turned on. The logical gating recognizes this condition and enables the input to the position counter PC so that the position counter PC is now counted down. As movement in the feed axis continues the logical gating network recognizes a predetermined minimum count in the position counter which in this specific case is representative of four counts and at this point enables the zero gate ZG to turn off a move flip-flop, here designated $FQmc$, to be described hereinafter, which indicates that the positioning movement is completed so that actual shut down occurs with the next count pulse $Pp$ or $Np$ to end the operation leaving three counts in the position counter to compensate the three counts that were counted into the overshoot counter at the beginning of the operation cycle just described.

For the particular embodiment of the invention illustrated herein, when the position counter PC contains only four counts the next pulse operates to count the position counter down to three counts and is utilized to reset the overshoot counter and flip-flops having to do with the control of movement, as will be described in greater detail.

With reference to FIG. 2 the position counter PC, as illustrated in said copending application, may comprise a plurality of flip-flops FQ18 through FQ1 arranged in descending order of significance. In the interests of drawing simplicity the counter PC is illustrated herein as a block having a count input facility for receiving either the output of an AND gate AG1 or the output of an OR gate OG3 which in the automatic mode respectively gate count pulses $Pp$ and $Np$ as illustrated. The gates AG1 and AG3 are the count gates. The gate AG2 is used to turn off the counter at a residual count of three. The output of the position counter is represented in outputs designated Q18 through Q1 in descending order representing the ON condition of each of the flip-flops and $\overline{Q}18$ through $\overline{Q}1$ representing the OFF condition of each of the flip-flops. An AND gate AG0 receives all of the electrical output $\overline{Q}18$ through $\overline{Q}1$ excepting the electrical output $\overline{Q}3$ to produce a stop signal generally designated S. This stop signal when combined with a selected one of the two output signals of each of the sign and directional flip-flops $FQs$ and $FQd$, together with the ON signals $Qo1$ and $Qo2$ of the overshoot flip-flops $FQo1$ and $FQo2$, the AND gates AG4 and AG5, respectively, is effective to produce stop signals designated $Sp$ and $Sn$ as illustrated.

The flip-flops in FIG. 2 forming part of the logical gating and controls LG of FIG. 1 comprise a flip-flop FQL which generally represents a limit flip-flop controlled by a limit switch LS (see FIG. 1). This flip-flop will always be set by the limit switch LS so that the signal QL is at gating level when the feed axis (machine table) moves out of limit position. A flip-flop $FQd$ is a directional flip-flop. Its output signal $Qd$ when the flip-flop is on indicates movement in the machine tool axis in the positive direction according to the convention adopted here and when it is turned off so that its output signal $\overline{Q}d$ is at operating or gating level this indicates that movement in the machine axis is in the negative direction. Further, by way of explanation, the positive direction may represent movement out of the retracted limit of the machine tool and the negative direction may represent movement of the machine tool toward the retracted movement. A sign flip-flop $FQs$ represents the sign of the overshoot register which comprises the flip-flops $FQo1$ and $FQo2$. This flip-flop is turned on ($Qs$) in the presence of pulses $Pp$ representing movement in the positive direction and is turned off ($\overline{Q}s$) by pulses $Np$ representing increments of movement in the negative direction. The gating of the count pulses $Pp$ and $Np$ is under the control of the overshoot counter, particularly the flip-flop $FQo2$.

The overshoot counter is set to zero, that is, both of its flip-flops are turned off at the start of a movement so that the signals $\overline{Q}o1$ and $\overline{Q}o2$ exist. The signal $\overline{Q}o2$ is coupled to respective AND gates AG13 and AG14, along with respective signals $Pp$ and $Np$ so that gating may take place to properly set the sign flip-flop $FQs$ at the beginning of an operation. A move flip-flop $FQm$ indicates that the axis is set to move whenever it is turned on. The output signal $\overline{Q}m$ is the only signal of the flip-flop $FQm$ that is used in connection with this invention. This signal is at gating level when the flip-flop FQm is turned off indicating that movement should not take place.

The overshoot counter comprises the flip-flops FQo1 and FQo2. These flip-flops are arranged to handle wrong-way pulses (see FIG. 3 of the above-referenced application Serial No. 421,743, entitled Counting Circuit, by M. R. McElroy, having an effective filing date of February 17, 1961, and assigned to the assignee of this invention). Said McElroy application describes a circuit involving flip-flops 60 and 62, respectively, flip-flops FQo1 and FQo2 of this application, permitting the handling of up to 6 wrong-way pulses during a counting operation, for example, the occurrence of pulses Np when pulses Pp are the right-way pulses, or vice versa. Additionally, up to 3 overshoot pulses may be counted. Provision is had for resetting the flip-flops of the overshoot counter by means of a reset circuit indicated coupled to reset input terminal R of these respective flip-flops. These flip-flops may be of the type described in said copending application of E. J. Toscano et al. During operation at the end of a count down operation of the position counter PC these flip-flops, along with the position counter, are automatically reset. Provision is had for setting selected other of the flip-flops, for example, the directional flip-flop FQd and the move flop-flop FQm which are turned on by the respective SET inputs indicated.

Assuming that the machine tool is to move in a positive direction the directional switch DS is operated so that the directional flip-flop FQd is turned on. The signal Qd is now at gating level. The move flip-flop will have been turned on by the SET input thereto so that the signal $\overline{Q}m$ is not at gating level. Additionally, the overshoot counter flip-flops FQo1 and FQo2 are both turned off so that the signals $\overline{Q}o1$ and $\overline{Q}o2$ are at gating level. Since movement is in the positive direction the pulses Pp will be produced. Note the signals on AND gate AG1 which gates the positive pulses to the counter are Qs, Qd, $\overline{Q}o2$ and $\overline{Q}o1$. Since the signals Qo1 and Qo2 are not now at gating level this gate is disabled.

Assume a count of 1000 has been read into the counter. The counter is now set for count down operation. As the machine tool moves out of its retract limit switch LS is operated to turn on flip-flop FQL; thus, the signal QL exists at gating level. This signal appears on both AND gates AG7 and AG8 enabling both gates. Pulses Pp are gated by gate AG7. The first pulse Pp on the J input terminal of flip-flop FQo1 turns this flip-flop on so that the signal Qo1 exists. This signal is on the gate AG18. Referring to gate AG13 since the signal $\overline{Q}o2$ exists during the interval of the first pulse Pp, the first pulse Pp is coupled through gate AG13 to the J input terminal of the overshoot register sign flip-flop FQs turning this flip-flop on so that signal Qs exists. Referring again to gate AG18 the signal Qs is also on gate AG18. The second pulse Pp is now coupled via gate AG18 to the J input terminal of flip-flop FQo2 producing the signal Qo2 at gating level. At the time the second pulse Pp occurred the flip-flop FQo2 was still off so that signal $\overline{Q}o2$ existed. This signal is on OR gate OG1. Thus, the second pulse Pp on AND gate AG11 is coupled to the K input terminal of flip-flop FQo1 to turn it off so that signal $\overline{Q}o1$ goes to gating level at the time signal Qo2 goes to gating level. Thus, for the second pulse Pp the overshoot counter is of the binary configuration 10 representing by binary weighted significance from left to right as viewed, the count of 2 pulses. Note may be made of the fact at this time that at the time the pulse from AG11 was coupled to the K side of FQp1 a pulse from AG7 was also coupled to the J input terminal thereof. The simultaneous coupling of pulses to this flip-flop results in the flip-flop changing its state to that described in which signal $\overline{Q}o1$ is at gating level. The third pulse is gated by the gate AG7 to the J side of flip-flop FQp1. Thus, this flip-flop is now switched on and the signal Qo1 is at gating level. The flip-flops are now in the configuration 11 in binary weighted significance representing a pulse count of 3 in which the signals Qo1 and Qo2 now simultaneously exist. Further counting by the shift register is now inhibited since the gates controlling counting, except gates AG7 and AG8, are disabled. Referring again to gate AG1 all of the signals thereon are now at gating level and the fourth pulse Pp is gated to the position counter. With the occurrence of pulse Pp No. 999 the position counter will be in the count configuration 0004 in which all of the flip-flops but the flip-flop producing the signal $\overline{Q}3$ will be turned off. Since the signal $\overline{Q}3$ is not on the AND gate AG0 producing the signal S the signal S will now be produced. This signal is coupled to the input of AND gate AG4 receiving also the signals Qs, Qd, Qo1 and Qo2. Thus, this gate is enabled and its output Sp is at gating level. The signal Sp is the positive stop signal and indicates that the machine element being positioned is in the target area. The 1000's pulse Pp is now gated by the AND gate AG9 which is coupled to the K input terminal of the move flip-flop FQm turning this flip-flop off and placing the signal $\overline{Q}m$ at gating level to indicate machine movement is to stop. The stop signal Sp enables an OR gate OG3 so that with the next occurring pulse Pp, that is, the 1000's count pulse, a signal is coupled to the K input terminal of the flip-flop FQo2 to turn it off which places the signal $\overline{Q}o2$ at gated level. Similarly, the stop signal Sp enables the AND gate AG11 to gate the 1000's pulse Pp to the K input terminal of an overshoot flip-flop FQo1 to place the output terminal producing signal $\overline{Q}o1$ at gating level. Thus, when the counter has reached the minimum count of 0003 which is the full 1000's count including the 3 counts that were placed in the overshoot flip-flops at the beginning of the count, the overshoot flip-flops are turned off. After these signals turn off the move flip-flop FQm its output $\overline{Q}m$ will be employed by means of a circuit, as generally shown in FIG. 1, to reset the position counter PC so that it too will show a zero count rather than a residual count of 3 as described. The term $\overline{Q}3$ is a timing term to prevent premature clamping off of the terms or signals Q1 and Q2 before the position counter reaches a count configuration of 00003.

Although this description has been concerned with pulses Pp it will be noted that the flip-flops FQd and FQs will each be turned off if movement is in the negative direction, in which case the signals $\overline{Q}s$ and $\overline{Q}d$ are at gating level. Thus, when 3 Np pulses have occurred so that the signals $\overline{Q}o2$ and $\overline{Q}o1$ are again at gating level AND gate AG3 is enabled to gate pulses Np to the position counter. The gate AG12 now gates the negative direction pulses Np for the flip-flop FQo1 the gate AG14 gates the negative pulses to set the sign flip-flop FQs to its $\overline{Q}s$ configuration and AND gate AG16, together with OR gate OG4 control the gating of the negative stop signals Sn rather than the positive signal Sp. The AND gate AG17 is used to control the J side of the flip-flop FQo2 and the AND gate AG10 is used to control the flip-flop FQm. The operation of the circuit for movement in the negative direction will be understood from that described for the positive direction.

A second count zero signal is produced at the time that the count of the position counter is completely zero, at which time the signal $\overline{Q}3$ which is the 4 weighted flip-flop in the least significant binary decade of the position counter PC, along with the signal S which also exists at this time, produces a zero signal which is also used to insure resetting of the move flip-flop FQm. If now the machine should move 1, 2 or 3 counts beyond the target position in the positive direction, which it will be recalled is the direction in which it was moving, these additional counts will be counted into the flip-flops of the overshoot counter. Note that both flip-flops were reset at the time the final pulse Pp occurred, as described above. If an additional or overshoot pulse is produced, gate AG7 couples this pulse to the J side of the flip-flop $FQo1$ so that signal $Qo1$ goes to gating level. With signal $Qo1$ at gating level and signals $Qs$ still at gating level the gate AG18 couples a second overshoot pulse to the J side of the flip-flop $FQo2$ and at the same time, since at this instant the signal $\overline{Q}o2$ is at gating level, the gate AG11 couples a trigger pulse to the K side of the flip-flop $FQo1$. The signals $\overline{Q}o1$ and $Qo2$ now exist. Gate AG7, with the occurrence of a third additional or overshoot pulse, gates a trigger pulse to the J side of the flip-flop $FQo1$ to turn this flip-flop on which brings the terminal producing signal $Qo1$ to gating level so that signals $Qo1$ and $Qo2$ are at gating level and the overshoot counter is full.

If movement in the machine axis continues a fourth overshoot pulse $Pp$ will be produced. Since both of the $Pp$ overshoot flip-flops are now turned on and the move flip-flop has been turned off so that the signal $\overline{Q}m$ exists and since the signal $Qs$ still exists, an AND gate AG19 is now enabled. Thus, the occurrence of the fourth pulse $Pp$ is gated by the AND gate AG18 via an OR gate OG5 to the J input terminal of an error flip-flop or other suitable switching or signaling device designated $FQe$. The output of this flip-flop when suitably amplified by means of a conventional amplifier such as A1 may be utilized to trigger or operate a relay R to activate both an alarm circuit and a stop circuit as shown. By this expedient the operator of the machine is alerted to the fact that the machine has moved out of recording limits in the axis and that remedial action must be taken otherwise an error will exist.

An OR gate OG6 may be utilized to reset the error flip-flop to permit retracting, to permit jogging to a predetermined position and to provide error reset to permit restarting. Logically the signals Retract and Jog may be *added* to the gates AG19 and AG20 to inhibit these gates. These signals may be represented as $\overline{Retract}$ and $\overline{Jog}$ and will have the same significance as the signal $\overline{Q}m$; thus, $\overline{Q}m$ means "no move" and $\overline{Retract}$ and $\overline{Jog}$ mean, respectively, "no retract" and "no jog."

FIG. 3 shows another embodiment of this invention. The circuit of FIG. 3 is added to that of FIG. 2. The gate structure is the same as that for detecting overshoot register overflow but uses only the signal $Qo2$ from the overshoot counter. This circuit is useful for indicating that the machine has moved two counts beyond the desired position in the axis under control and while not showing an error provides information useful in adjusting the machine tool to eliminate the over-run if this is necessary or desirable.

What is claimed is:

1. In a positioning system, the combination of:
   drive means for positioning a movable element;
   electrical control means coupled to and controlling said drive means;
   a position counter;
   means coupled to said position counter to set said position counter to a count indicative of a desired position of said movable element;
   count pulse generating means coupled to said movable element for producing a count pulse for each predetermined increment of movement of said movable element;
   a move flip-flop normally in one electrical state during movement of said movable element;
   an overshoot counter;
   position counter gating means coupled to and controlled by said overshoot counter in a particular electrical configuration of said overshoot counter for gating count pulses to said position counter to operate said position counter;
   stop signal gating means coupled to said position counter and having an output coupled to said move flip-flop to switch said move flip-flop from said one electrical state to a second electrical state upon the occurrence of a count pulse when said position counter is in a predetermined electrical state;
   and output gating means coupled to said move flip-flop and said overshoot counter and enabled when said overshoot counter is in a predetermined electrical configuration and said move flip-flop is in said second electrical state to produce an electrical output.

2. In a positioning system, the combination of:
   drive means for positioning a movable element;
   electrical control means coupled to and controlling said drive means;
   a position counter;
   means coupled to said position counter to set said position counter to a count indicative of a desired position of said movable element;
   count pulse generating means coupled to said movable element for producing a count pulse for each predetermined increment of movement of said movable element;
   a move flip-flop normally in one electrical state during movement of said movable element;
   an overshoot counter;
   position counter gating means coupled to and controlled by said overshoot counter in a particular electrical configuration of said overshoot counter for gating count pulses to said position counter to operate said position counter;
   stop signal gating means coupled to said position counter and having an output coupled to said move flip-flop to switch said move flip-flop from said one electrical state to a second electrical state upon the occurrence of a count pulse when said position counter is in a predetermined electrical state;
   output gating means coupled to said move flip-flop and said overshoot counter and enabled when said overshoot counter is in said particular electrical configuration and said move flip-flop is in said second electrical state to produce an electrical output;
   and means responsive to said last named electrical output for producing an error signal.

3. Apparatus as set forth in claim 2 and in addition:
   second gating means coupled to said move flip-flop and said overshoot counter and enabled when said overshoot counter is in an electrical configuration less than that indicative of a full overshoot count and when said move flip-flop is in said second electrical state to produce an electrical output.

4. Apparatus as set forth in claim 2 in which:
   said stop signal gating means is additionally coupled to said overshoot counter to be enabled thereby when said overshoot counter is in said particular electrical configuration.

5. Apparatus as set forth in claim 2 in which:
   said count pulse generating means produces first count pulse for increments of movement of said movable element in one direction and second count pulses for increments of movement of said movement of said movable element in a second direction;
   in which said position counter gating means includes a first count gate for gating said first count pulses and a second count gate for gating said second count pulses;
   and in which both of said first and said second count gates are coupled to and enabled by said position counter in said particular electrical configuration;
   and including in addition an overshoot counter sign flip-flop having a first output coupled to said first count gate and a second output coupled to said second count gate for selectively controlling said first and said second count gates;
   and first and second output gates forming part of said output gating means and coupled to and controlled by said overshoot counter, said move flip-flop and said overshoot counter sign flip-flop.

6. Apparatus as set forth in claim 2 in which said stop signal gating means comprises first and second stop signal gates each coupled to and controlled by said overshoot counter sign flip-flop.

7. Apparatus as set forth in claim 2 and including overshoot counter gating means coupled to and controlled by said overshoot counter for gating count pulses to said overshoot counter when said overshoot counter is not in said particular configuration.

8. Apparatus as set forth in claim 2 and including in addition reset gating means coupled to and enabled by said stop signal gating means for resetting said overshoot counter.

References Cited

UNITED STATES PATENTS

| 2,901,927 | 9/1959 | Morgan | 235—151.11 |
|---|---|---|---|
| 3,068,386 | 12/1962 | Jaeger et al. | 235—151.11 |
| 3,099,777 | 7/1963 | Davis | 318—28 |
| 3,218,532 | 11/1965 | Toscano | 318—28 |

ROBERT C. BAILEY, *Primary Examiner.*

G. SHAW, *Assistant Examiner.*